United States Patent
Xhafa et al.

(10) Patent No.: US 9,867,130 B2
(45) Date of Patent: Jan. 9, 2018

(54) SYSTEM AND METHOD FOR ULTRA LOW POWER MODE TRANSMISSION

(71) Applicant: TEXAS INSTRUMENTS INCORPORATED, Dallas, TX (US)

(72) Inventors: Ariton E. Xhafa, Plano, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 95 days.

(21) Appl. No.: 15/019,721

(22) Filed: Feb. 9, 2016

(65) Prior Publication Data
US 2016/0323824 A1     Nov. 3, 2016

Related U.S. Application Data

(60) Provisional application No. 62/153,802, filed on Apr. 28, 2015.

(51) Int. Cl.
*H04W 52/02* (2009.01)
*H04W 56/00* (2009.01)

(52) U.S. Cl.
CPC ... *H04W 52/0235* (2013.01); *H04W 52/0216* (2013.01); *H04W 52/0229* (2013.01); *H04W 56/001* (2013.01); *Y02B 60/50* (2013.01)

(58) Field of Classification Search
CPC ......... H04W 52/0235; H04W 52/0216; H04W 52/0229; H04W 56/001; Y02B 60/50
See application file for complete search history.

(56) References Cited

U.S. PATENT DOCUMENTS

| | | | |
|---|---|---|---|
| 2012/0069893 A1* | 3/2012 | Shirakata | H04L 25/0262 375/239 |
| 2014/0119410 A1* | 5/2014 | Tian | H04B 1/707 375/146 |
| 2016/0037449 A1* | 2/2016 | Kandhalu Raghu | H04W 52/0209 370/311 |

OTHER PUBLICATIONS

IEEE Std. 802.15.4e, "Low-Rule Wireless personal Area Networks (LR-WPANs)", Amendment 1: MAC Sublayer, Apr. 16, 2012.
IEEE Std. 802.15.4g, "Smart Utility Networks", 2011.

* cited by examiner

*Primary Examiner* — Duc C Ho
(74) *Attorney, Agent, or Firm* — Ronald O. Neerings; Charles A. Brill; Frank D. Cimino

(57) ABSTRACT

A time slot assignment arrangement for ultralow power devices in a wireless communication network is disclosed. The time slot assigned to ultralow power device wakeup frame is identified as ultralow power timeslot using various indicators. The ultralow power timeslot is assigned as contention based timeslot allowing ultralow power devices in the wireless network to extend the interval for synchronizing with the network overcoming the short synchronization interval requirements of wireless communication network resulting in significant improvement in battery life by preserving the power needed for frequent synchronization with the wireless communication network.

20 Claims, 4 Drawing Sheets

SYSTEM AND METHOD FOR ULTRA LOW POWER MODE TRANSMISSION

CROSS-REFERENCE TO RELATED APPLICATIONS

This application claims priority to the U.S. provisional patent application Ser. No. 62/153,802, filed Apr. 28, 2015, the entirety of which is hereby incorporated herein by reference for all purposes.

TECHNICAL FIELD

This disclosure relates generally to the field of wireless communication and more particularly to the field of low-power wireless communication networks.

BACKGROUND

In wireless communication networks, a network control element or coordinator transmits periodic beacons that include information to facilitate communication with various wireless devices or nodes that are either part of the wireless communication network or intend to join the wireless communication network. The information in the beacon may identify frequency channels to be used for communication at any specific time, timing information when this beacon is sent, link information, and other network and communication related parameters etc. Wireless devices or nodes can use this information for data transmission in the wireless communication network. To communicate in the wireless communication network, devices and nodes are required to be synchronized with the beacon transmission timing so they can receive beacons timely and communicate in the network.

Beacon reception and synchronization in wireless networks depend on the accuracy of the clock crystal used in devices and nodes. Periodicity of beacon transmission is chosen such that beacons can be received before the synchronization is lost. For example, with a typical clock crystal accuracy of about 40 ppm and a 2 msec guard time interval in the transmission frame, beacons are required to be transmitted about every 25 seconds. This requires devices and nodes to wake up and receive a beacon every 25 seconds. For devices and nodes that transmit data for example, every 30 minutes or every hour, waking up at every 25 seconds interval significantly reduces power efficiency.

Generally, devices and nodes operate on battery power. These batteries are expected to last for long time; however, with frequent awaking for beacon reception for synchronization, even when there is no data to transmit, these devices and nodes loose battery power much faster. Wireless networks, such as for example IEEE 802.15.4e—Time Slotted Channel Hopping (TSCH), Wireless Sensor Networks (WSN), and the like, require battery power to be preserved so that devices and nodes can operate for long time without frequently changing the battery.

Referring to FIG. 1, a conventional timeslot operation of TSCH based wireless network is illustrated. The transmission time is spread into slot-frames where each slot-frame includes timeslots (or slots). Devices and nodes communicate in the network during the allocated timeslots using various different channels. For example, if node A and node B are assigned time slot 3 in slot-frame 1 to communicate with each other, then they may communicate using channel 3; however, in time slot 4 in slot-frame 2 they may communicate using channel 5 and the like.

Referring to FIG. 2, a timeline of conventional time slot operation of TSCH based wireless network is illustrated. A guard time of about 2 msec at the receive side is added. The relationship of the guard time to synchronization interval and clock crystal accuracy is given as:

Synchronization_interval=guard_time/(2*clock_accuracy)

Table 1 illustrates synchronization intervals for different crystal accuracies for TSCH assuming about 2 msec guard time interval. As illustrated, a device/node with crystal accuracy of about 40 ppm, a synchronization with the network is required about every 25 seconds.

TABLE 1

Synchronization intervals for different crystal accuracies for TSCH.

| | Crystal Accuracy (ppm) | | | | |
|---|---|---|---|---|---|
| | 20 | 30 | 40 | 50 | 60 |
| Synch Interval (sec) | 50 | 33 | 25 | 20 | 16 |

To join the wireless communication network, a device/node scans transmission channels for beacons that are sent by a network element or network coordinator. Beacons include information about shared and dedicated slots (or timeslots), which are used by the device/node to establish communication link in the network. Once the device/node joins the network, then it starts reporting data to the network coordinator using the dedicated slots and at times, using shared slots.

The type of application being executed at the device/node determines the frequency of data reporting to the coordinator node. For example, some applications may require that data be reported every 30 minutes, or every hour, or once a day and the like. For these devices/node, having to synchronize with the network more often than needed to report data (e.g., every 25 seconds), required significant power usage and makes the device/node power inefficient.

SUMMARY

According to an embodiment, a device is disclosed. The device includes a transceiver, and a processor coupled to the transceiver. The processor is configured to determine a wireless network synchronization time period, and identify a timeslot for transmitting a frame as ultralow power timeslot if a synchronization time period of the wireless network is shorter than a predetermined time period.

In accordance with another embodiment, a method is disclosed. The method includes determining a wireless network synchronization time period, and identifying a timeslot for transmitting a frame as ultralow power timeslot if a synchronization time period of the wireless network is shorter than a predetermined time period.

In accordance with yet another embodiment, a network element is disclosed. The network element includes a transceiver configured to transmit and receive data in a wireless network, and a processor coupled to the transceiver and configured to determine data transmission time of a network device, and identify a timeslot for receiving a frame from the network device as ultralow power timeslot if a synchronization time of the wireless network is shorter than data transmission time interval of the network device.

DETAILED DESCRIPTION

The following description provides many different embodiments, or examples, for implementing different features of the subject matter. These descriptions are merely for illustrative purposes and do not limit the scope of the invention.

According to an embodiment, a time slot assignment arrangement is disclosed to overcome the short synchronization interval requirements of wireless communication network. The time slots assigned to ultralow power device wakeup frame are identified as ultralow power timeslot using various indicators. The ultralow power timeslots are assigned as contention based timeslots allowing ultralow power devices in the wireless network to extend the interval for synchronizing with the network to overcome the short synchronization interval requirements of wireless communication network thus significantly improving battery life by preserving the power.

Figure 1:
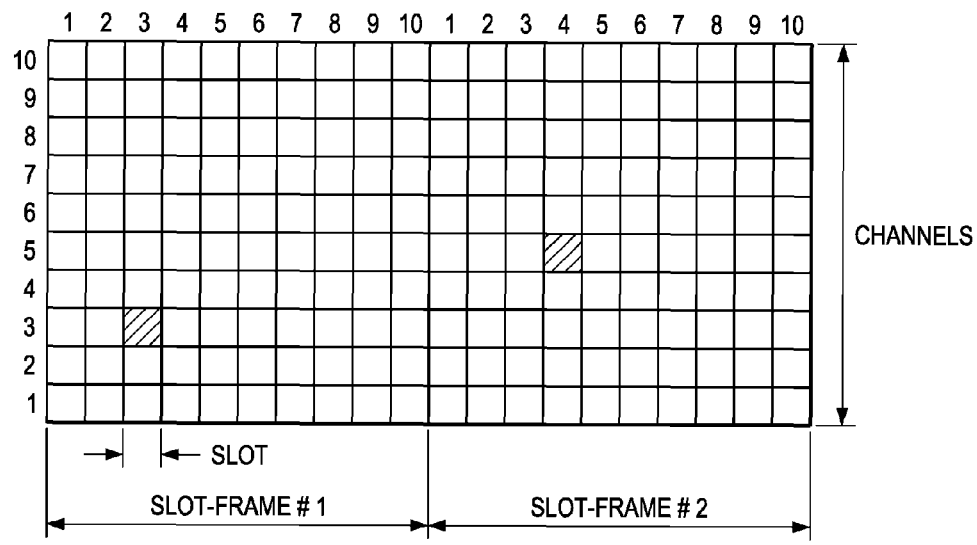
FIG. 1 illustrates a conventional timeslot operation of TSCH based wireless communication network.
Figure 3B:
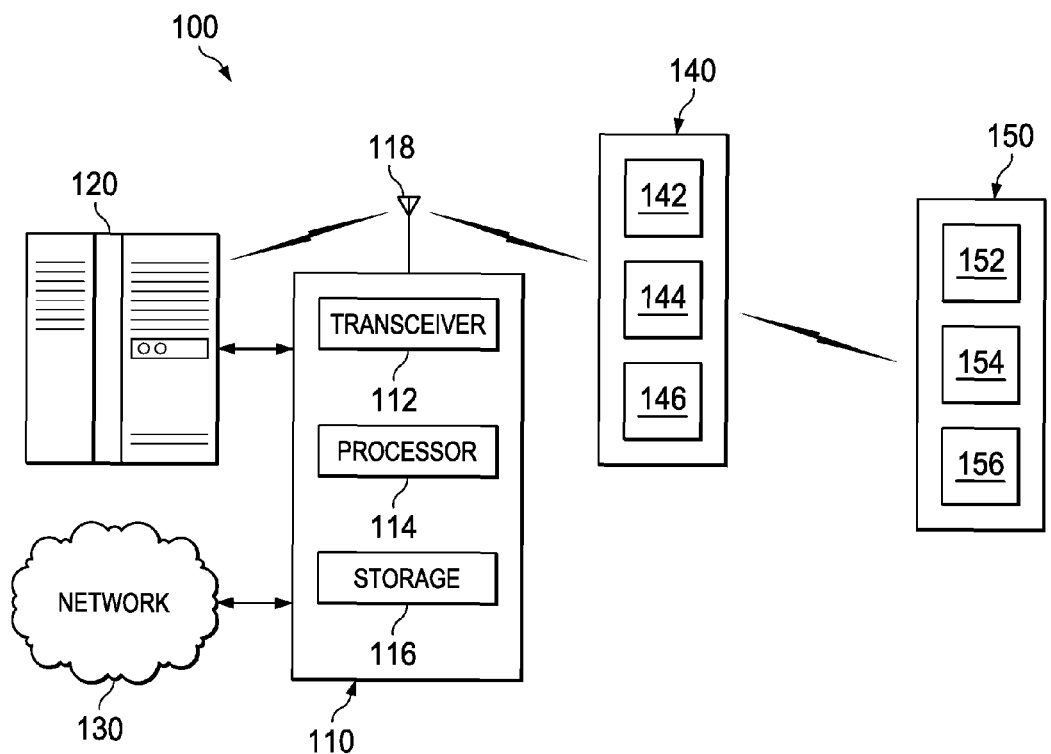
FIG. 3B illustrates an exemplary structure of network nodes in wireless communication network according to an embodiment.
Figure 3A:
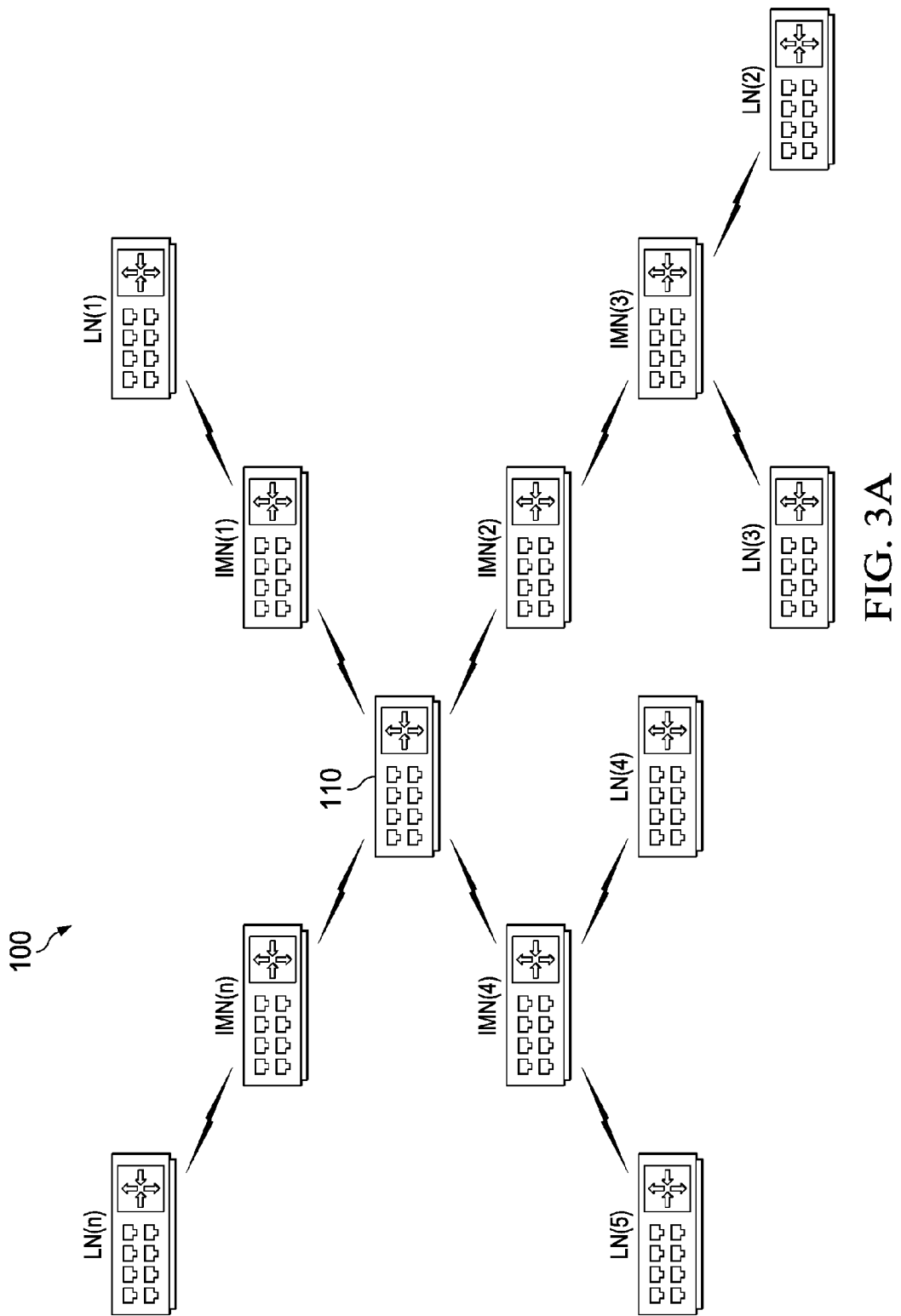
FIG. 3A illustrates an exemplary wireless communication network according to an embodiment.

Referring to FIG. 3A, a network 100 according to an embodiment is illustrated. Network 100 includes a network coordinator 110, intermediate nodes INM(1)-(n), and leaf nodes LN(1)-(n). Intermediate nodes INM(1)-(n) are nodes that provide a communication path for leaf nodes LN(1)-(n) to network coordinator 110. There can be one or more than one hop connection from leaf node to the network coordinator such as for example, leaf node LN(1) has to go through only one intermediate node INM(1) to get to the network coordinator 110 where leaf nodes LN(2) and LN(3) have to hop through two intermediate nodes INM(2) and INM(3) before getting to the network coordinator 110. Similarly, there can be many intermediate nodes between a leaf node and the network coordinator based on any particular network configuration.

When a new node (leaf node or intermediate node) joins the network 100, then based on the network communication protocol of the network 100, the new node scans transmission channels to search for beacons broadcast by the network coordinator and determines a time slot that it can use to establish credentials with the network coordinator. Once the new node establishes credentials with the network coordinator and joins the network 100, the network coordinator can assign a dedicated link and time slot to the new node to send data to the network coordinator and other nodes in the network.

Referring to FIG. 3B, an exemplary structure of network nodes (leaf, intermediate or coordinator) in wireless network 100 is illustrated according to an embodiment. Network 100 includes a network element 110 as network coordinator for network 100. The network element 110 can be any wireless communication network element for example, an access point, a network relay, a network extender, a wireless router, or any other device capable of connecting to a network and provide wireless communication connections to various devices. The network element 110 includes a transceiver 112, a processor 114, a storage device 116, and an antenna 118 among various other system components. Although for explanation, simple elements are shown; however, the network element 110 can have various others system components and multiple elements for example, the network element 110 can have multiple processors, antennas, storage devices, transceivers, displays, user interface, and the like.

The network element 110 may be communicatively coupled to a backend network device 120 and a network 130. The network element 110 can be coupled to various other networks and systems to provide network services for example, network element 110 can be connected to content servers, Internet, cellular networks, media service providers, routers, and the like. Further, the network element 110 can be connected to these systems via wireline or wireless communication links or combination thereof. The network 100 includes various wireless communication devices such as for example, an intermediate node 140, and a leaf node 150. While for exemplary purposes only one intermediate and leaf nodes are shown; however, network 100 can have multiple intermediate and leaf nodes such as for example as illustrated in FIG. 3A. The network 100 can also include many other devices capable of wirelessly communicating with the network element 110 such as control systems, printers, consumer electronic devices, and various other devices and systems. Further, the network element 110 can also be communicatively coupled to other network elements in a mesh or other types of network schemes. Each of the network elements such as the intermediate node 140 and leaf node 150 may also include various other system components such as transceivers 142, 152, processors 144, 154, storage devices 146, 156, and other components like displays, keyboards, antennas, other user interface, and the like (not shown).

According to an embodiment, the network coordinate designates transmission link and one or more communication time slots as contention based time slots. These time slots are used as ultralow power timeslots (ULPT). These slots are different than shared timeslots that are uses by various nodes in the network for transmission of packets/frames/data. The network coordinator defines an information element for intermediate and leaf nodes to request and identify a time slot as contention based time slot. For example, IEEE 802.15.4e defines a Link information element (Link IE) for Time Slotted Channel Hopping (TSCH) protocol as illustrated in Table 2.

TABLE 2

| Link IE | | | |
|---|---|---|---|
| Octets | | | |
| 2 | 2 | | 1 |
| Information | Timeslot | Channel offset | Link options |

The Link IE is five octets long. The first two octets include information about the time slot that is used to communicate the information. The next two octets include information about the channel offset used to determine the transmission channel to be used for the communication. The last octet is partially used to indicate whether the link is transmission (TX) link, reception (RX) link, or shared link. Currently, a part of the last octet in TSCH protocol is reserved. According to an embodiment, the reserved portion of the last octet can be used to indicate whether the link assigned to the node is for ultralow power time slot (ULPT).

When a node such as a leaf node wakes up from an inactive state, then it requests the network coordinator for transmission resources to transmit data and reports to the network coordinator and other nodes in the network. The network coordinator assigns transmission resources including a transmission link and time slot, which the leaf node can use to transmit data. The assigned link may have an associated life timer. The life timer is a time period during which the leaf node can use the assigned link. When the life timer expires, the leaf node no longer has the assigned link available for data transmission.

The time slot assigned to a node (e.g. leaf node) can be designated as ULPT. The designation of the assigned time slot can be based on applications being executed on the node. For example, if the network requires synchronization every 25 second; however, the application executing on the node requires data transmission every hour, then the node does not need to waste power resources to synchronize every 25 second. It can identify its assigned time slot as contention based time slot thus it can wait to synchronize with the network and doesn't need a dedicated time slot. The designation of the assigned time slot can be done by any node in the network including the network coordinator using the Link IE. The network coordinator can also designate the assigned time slot as ULPT based on its knowledge of the leaf node, applications running on the leaf node, and its transmission schedule. Because these time slots are designated as contention based timeslots, the conventional timeslot structure illustrated in FIG. 2 does not apply to ULPT transmission. During transmission in ULP timeslots, nodes contend for transmission of ULP wakeup frames as illustrated in Table 3.

TABLE 3

ULP wakeup frame.

| | | | Field | | | |
|---|---|---|---|---|---|---|
| | Frame Control | Seq. Number | Dest. PAN ID | Dest. Address | Source Address | Timeslot End (in microsec) |
| Size | 2 Bytes | 1 Byte | 2 Bytes | 2 Bytes | 2 Bytes | 4 Bytes |

The wakeup frame illustrated in Table 3 is similar to the wakeup frame defined by 802.15.4e. According to an embodiment, a new frame type is defined. The new frame type can indicate that the wakeup frame is a ULP wakeup frame. The frame type can be indicated by any designation for example, a frame type 110 or the like. According to another embodiment, an additional field "Timeslot End" is disclosed to be added to the standard wakeup frame fields. The Timeslot End field indicates the end of the timeslot based on the estimation of a node (e.g., leaf node), with respect to when the wakeup frame is sent. This estimated time can be used by a receiving node (e.g., intermediate node, or network control node, etc.) to estimate the time correction needed for the ACK response for the leaf node.

To transmit wakeup frame, a leaf node contends for the transmission channel. If there is a collision during the ULP timeslots, then the leaf node may use a back-off mechanism such as for example exponential back-off or the like and at the expiration of back-off time, the leaf node contends again for the transmission channel. The time for back-off window can be negotiated at the time when a leaf node joins or associates with the network or it can be mandated by a network control node in its control messages such as for example, beacon frames.

Figure 2:
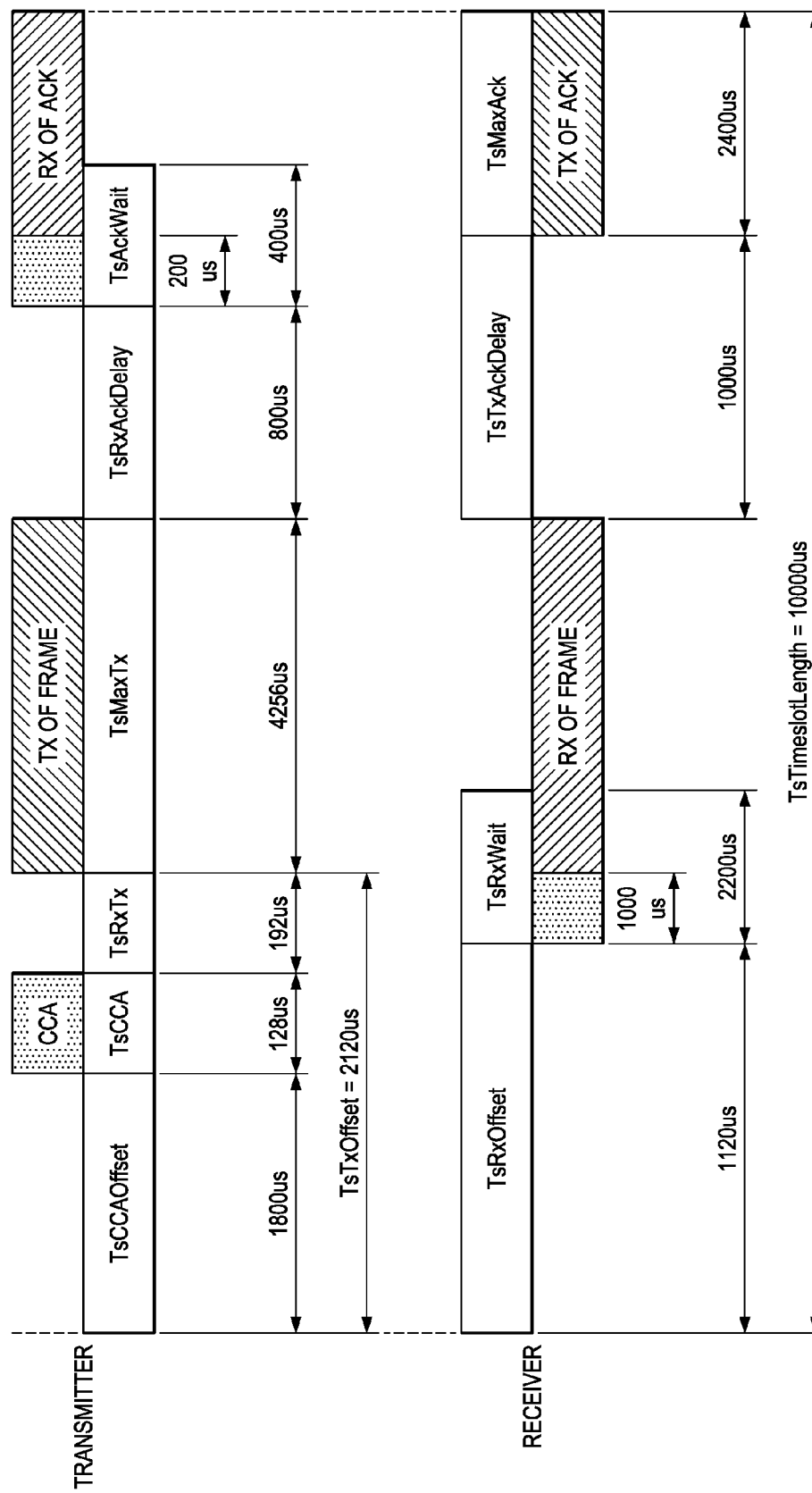
FIG. 2 illustrates a timeline of conventional time slot operation of TSCH based wireless network.

As illustrated in FIG. 2, the Rx guard time can be used by an intermediate node (or a parent node) that is coupled to a leaf node such as an intermediate or coordinator/root node. Leaf nodes can transmit data in ULP timeslots if the end of the timeslot timing, based on the leaf node estimation, enables leaf nodes to do the following:

Backoff+tx_time_ULPwakeupframe+inter-
frame_spacing+time_akc_withcorrectionIE

Where

| | |
|---|---|
| Backoff | Back-off time calculated by the node |
| tx_time_ULPwakeupframe | transmission time required for ULP WakeupFrame |
| interframe spacing | space between frames transmitted |
| time_ack_withcorrectionIE | transmission time of an ACK packet that contains a time correction IE |

As stated hereinabove, when a receiver node receives data from a sender node, then it calculates time for transmitting acknowledgement (ACK) based on the timing correction information received in the TimeslotEnd field value of the wakeup frame. This can be a difference from the TimeslotEnd value in the ULP wakeup frame and the parent node receiving the ULP wakeup frame. The ACK frame also include information about the timeslot assignment for any additional transmission from/to the ULP leaf node and the Absolute Slot Number (ASN).

In exemplary embodiment, to send a data frame of about 1280 Bytes (e.g., in IEEE 802.15.4g), the timeslot size can be larger than 200 msec. The transmission of ULP wakeup frame and ACK may require about 20-30 msec (including inter-frame spacing). This leaves about 170 msec of transmission time that can be used by ULP leaf nodes for transmission of these frames. Thus resulting in about 85× improvements over legacy TSCH guard time and synchronization interval. In the exemplary embodiment, this may result in about 18 minute synchronization interval for the ULP leaf nodes, which allows leaf nodes to save more power by not synchronizing with the network sooner than 18 minutes.

In certain cases, synchronizing every 18 minutes may still be too frequent if the node transmissions are required every hour or so. To further reduce the synchronization frequency, or increase synchronization interval, the network control node (root node) may group consecutive timeslots and assign them to ULPT timeslots. Thus, for 3 concatenated timeslots, the synchronization interval will be larger than 3700 sec. This results in synchronization by ULP leaf nodes at about every hour. Similarly, to provide different synchronization intervals, the root/coordinator node can group different consecutive timeslots allocated for ULP leaf nodes based on a particular application and the size of the slotframe and network supported. This approach significantly increases synchronization interval for leaf nodes in a synchronized channel hopping network resulting in higher power efficiency and longer battery life.

Figure 4:
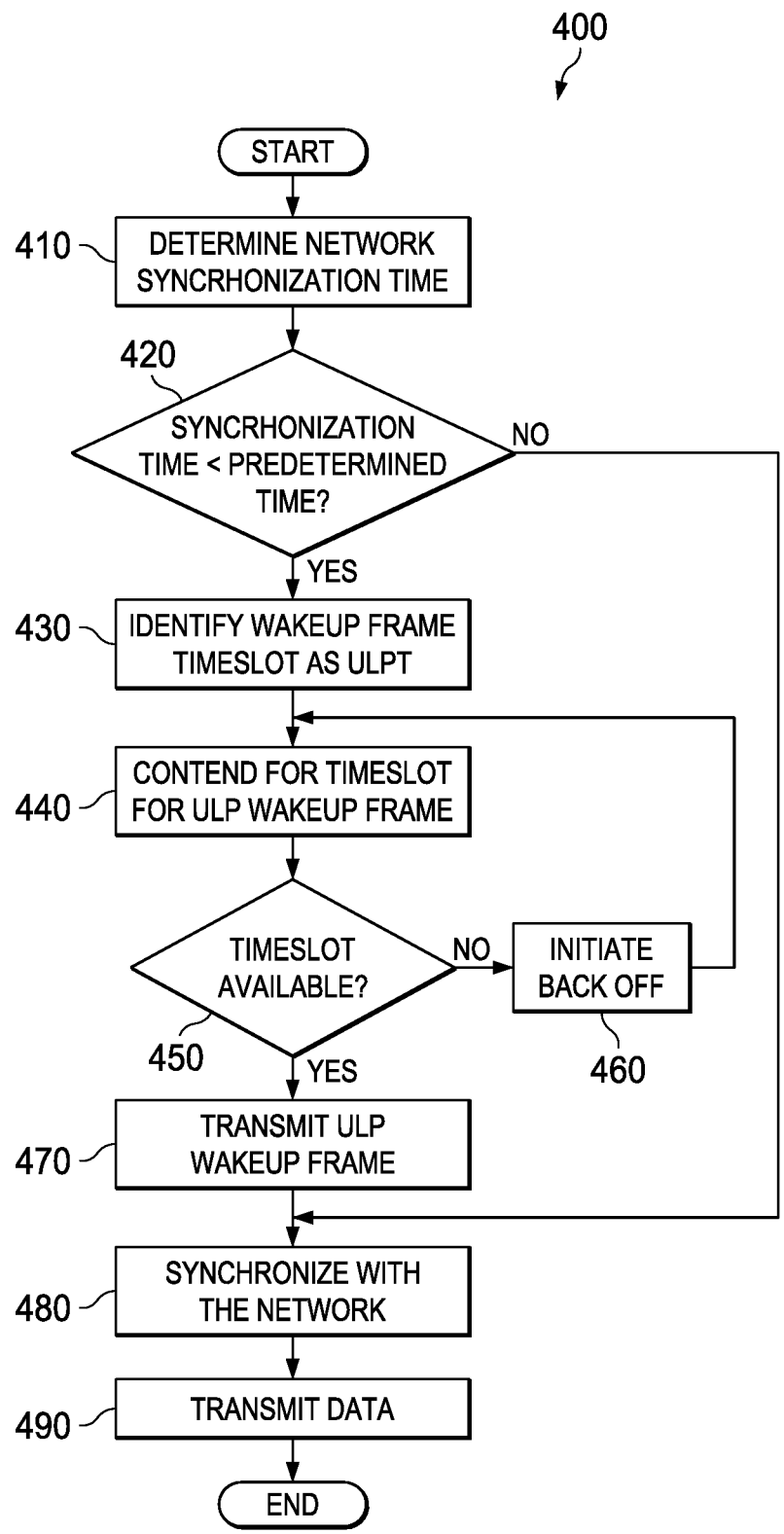
FIG. 4 illustrates a flowchart for transmitting data in ultralow power mode in a wireless communication network according to an embodiment.

Referring to FIG. 4, a flowchart for transmitting data in ultralow power mode in a wireless communication network is illustrated. At 410, device or network element for example, a leaf node or the like determines network synchronization time period of the wireless communication network. As stated hereinabove, the network synchronization time can be determined by a network coordinator and according to clock crystal accuracy of the network node. At 420, the device determines whether the network synchronization time period smaller than a predetermined time period.

The predetermined time period can be data transmission time interval of an application executing on the device. There can be multiple applications executing on the device and given the need for transmitting data for each application, the device can adjust the predetermined time period accordingly to ensure that the device is synchronized with the network for data transmission. If network synchronization time period requirement is not less than the predetermined time interval, then the device proceeds to 480 to synchronize with the network and transmit data at 490 as needed.

When the network synchronization time period is smaller than the time interval needed to transmit data, then to avoid frequent network synchronization, the device identifies its wakeup frame time slot as ultralow power timeslot (ULPT). As stated hereinabove, the identification of wakeup frame time slot as ULPT can be determined by a network coordinator node also based on the data transmission schedule of the leaf node, clock crystal accuracy, and the like. When the timeslot is identified as the ULPT, then the timeslot is no longer dedicated and the leaf node has to contend for the timeslot to transmit the wakeup frame. The contention base timeslot allows the leaf node to delay the synchronization and improve the power efficiency. At 450, the device determines whether a timeslot is available for transmission and if the time slot is not available, then the device initiates back-off mechanism as explained hereinabove and contends for the timeslot again at 440. The back-off can start when checking for the timeslot for the first time to avoid collisions. If a timeslot is available, then at 470, the device transmits the wakeup frame and synchronizes with the network at 480 and transmits data at 490.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device comprising:
    a transceiver; and
    a processor coupled to the transceiver and configured to:
        determine a wireless network synchronization time period, and
        identify a timeslot for transmitting a frame as ultralow power timeslot when a synchronization time period of the wireless network is shorter than a predetermined time period.

2. The device of claim 1, wherein the processor is further configured to transmit a wakeup frame to a network element using the ultralow power timeslot in the wireless network.

3. The device of claim 2, wherein the processor identifies the timeslot as ultralow power timeslot by setting an indicator in a link information element indicating a link for transmitting the wakeup frame as ultralow power timeslot link.

4. The device of claim 2, wherein the wakeup frame includes a frame type indicator indicating the wakeup frame as the ultralow power wakeup frame.

5. The device of claim 4, wherein the ultralow power wakeup frame includes a timeslot end field including a time period indicting an end of the ultralow power timeslot with respect to a time when the ultralow power wakeup frame is transmitted to the network element in the wireless network.

6. The device of claim 4, wherein the frame type indicator is included in a frame control field of the wakeup frame.

7. The device of claim 1, wherein the ultralow power timeslot is contention based timeslot.

8. The device of claim 1, wherein the predetermined time period is data transmission time interval of an application executing on the device.

9. A method comprising:
    determining, a wireless network synchronization time period; and
    identifying, a timeslot for transmitting a frame as ultralow power timeslot when a synchronization time period of the wireless network is shorter than a predetermined time period.

10. The method of claim 9, further comprising:
    transmitting a wakeup frame in the ultralow power timeslot to a network element in the wireless network.

11. The method of claim 10, further comprising:
    identifying the ultralow power timeslot as contention based timeslot.

12. The method of claim 11, wherein identifying the timeslot for transmitting the wakeup frame as ultralow power timeslot further comprising:
    setting an indicator in a link information element indicating a link for transmitting the wakeup frame as ultralow power timeslot link.

13. The method of claim 10, wherein the wakeup frame includes a frame type indicator indicating the wakeup frame as the ultralow power wakeup frame.

14. The method of claim 13, wherein the wakeup frame includes a timeslot end field including a time period indicting an end of the ultralow power timeslot with respect to a time when the ultralow power wakeup frame is transmitted to the network element in the wireless network.

15. The method of claim 13, wherein the frame type indicator is included in a frame control field of the wakeup frame.

16. A network element comprising:
   a transceiver configured to transmit and receive data in a wireless network; and
   a processor coupled to the transceiver and configured to:
      determine data transmission time of a network device, and
      identify a timeslot for receiving a frame from the network device as ultralow power timeslot when a synchronization time of the wireless network is shorter than a data transmission time interval of the network device.

17. The network element of claim 16, wherein
   a wakeup frame is transmitted in the ultralow power timeslot, and
   the ultralow power timeslot is contention based timeslot.

18. The network element of claim 17, wherein the wakeup frame includes a frame type indicator indicating the wakeup frame as the ultralow power wakeup frame.

19. The network element of claim 18, wherein the frame type indicator is included in a frame control field of the wakeup frame.

20. The network element of claim 17, wherein the wakeup frame includes a timeslot end field including a time period indicting an end of the ultralow power timeslot with respect to a time when the wakeup frame is received from the network device.

* * * * *